United States Patent Office 2,816,035
Patented Dec. 10, 1957

2,816,035

MANUFACTURE OF SAUSAGES

Elmer F. Glabe, Chicago, Ill., assignor to the United States of America as represented by the Secretary of Agriculture No Drawing. Application August 11, 1953,
Serial No. 382,492

4 Claims. (Cl. 99—109)

A non-exclusive, irrevocable, royalty-free license in the invention herein described, for all governmental purposes, throughout the world, with the power to grant sublicenses for such purposes, is hereby granted to the Government of the United States of America.

This invention relates to the manufacture of emulsion type sausages such as frankfurter and bologna. It relates more particularly to an emulsion type sausage composition which, by virtue of certain non-sausage constituents possesses a high water retention and a high stability against physical and structural deterioration.

The manufacture of emulsion-type sausages is a complex operation consisting of chemical reactions within the products which are not yet thoroughly understood. The emulsion involved is one which is greatly influenced by the degree and amount of mechanical chopping or agitation. It is common practice to add ice during the chopping operation to hold down the temperature which would normally rise due to the rapid action of the chopper. The ice, of course, is converted to water during the operation, and this water must be absorbed and held in suspension throughout the chopping, stuffing, smoking, cooking and cooling steps as they may be involved in the process.

Many substances have been used heretofore to assist the absorption of water and to render the emulsion stable. These substances include cereals, starchy binders, powdered milk, soybean flour and the like. The kinds and amounts of additives vary greatly with the particular manufacturing locality. In many important localities it is common practice to include rather large proportions of water, usually added as ice during the chopping operation.

This invention is based upon the discovery that "Gelsoy" is capable of altering the texture characteristics of emulsion type sausages such as frankfurters and bologna. Its apparent action is to stabilize or otherwise effect the emulsion character of the water and meat, permitting the latter to absorb and hold more water during the processing operations. It has a further advantageous effect, for it provides a finished sausage with a firm texture.

In this specification and claims, the "Gelsoy" refers to a water extractable proteinaceous material from oil-free soybean material that has been previously washed or extracted with a lower aliphatic alcohol, such as ethanol. Gelsoy and methods for producing it are described in U. S. Patent No. 2,495,706 granted to De Voss, Beckel and Belter. Briefly stated, the product is prepared by treating a proteinaceous soybean material such as hexane-extracted soybean flakes with an alcohol, such as ethanol in a concentration of from about 50 percent to absolute. This is primarily a washing treatment to remove anti-gelling factors and other alcohol soluble matter. The treated soybean material is then extracted with water, and the proteinaceous material recovered from the aqueous extract is Gelsoy.

Utilizing the foregoing discoveries, this invention provides a method for manufacturing superior sausages and provides a finished sausage product which possesses the advantageous properties previously mentioned. In general, the method of manufacture may vary over wide limits to provide for the particular type of sausage desired, the individual recipe, and the like. The formulae in which this invention is most advantageous, however, are those which call for macerating a proportion of lean meat and a proportion of fat in the presence of added water, preferably added at least in part as ice. Seasoning such as salt, spices, sugar, and the like as well as seasoning agents may be present during maceration or may be added later. The Gelsoy may be added at any time during or before the maceration, i. e., in the grinding or chopping steps. For best results it should be added at such a time as to afford uniform distribution throughout the sausage mass. The maceration steps are then followed by a series of finishing operations which includes stuffing, smoking, and cooking. These latter steps may be carried out as is commonly done in this art.

According to the present invention, Gelsoy may also be used in conjunction with either or both of the customary starchy or protein binders, as, for example, cereal or dried skim milk powder. Its advantages over each are distinctive, however, for it possesses the water-holding properties of the former without reducing the protein content of the sausage, and it is superior in water-binding to the latter. It also provides a sausage with a firm texture without adversely affecting the flavor.

The following specific examples are illustrative of the invention. The beneficial effects of Gelsoy in the sausages may be realized over a range of 0.25 percent to 5.0 percent of Gelsoy based on the meat-fat formula. It will be noted from the example that the effect of Gelsoy is heightened as the amount of added water is increased above 40 percent based on the formula weight. In the range of 40 percent and above of added water the behavior of Gelsoy as an emulsion agent is quite pronounced. This invention, however, is not limited to the use of such high water formulas.

*Example 1*

Frankfurters were prepared using a formula known in the trade as an 80 percent lean meat plus 20 percent fat formula. Of the lean meat, 55 percent was beef and 25 percent was pork. Of the fat, 80 percent was beef fat and 20 percent was pork fat. The usual amounts of ice, seasoning and curing agents were employed along with typical grinding, chopping, stuffing, smoking, and cooking operations.

Powdered skim milk has been used for many decades as an additive to improve the water absorption and the stability of the sausage emulsion during sausage manufacturing. The following comparative tests were made:

No. 1. Control—no milk powder and no Gelsoy. Thirty-six percent water added on the basis of the meat as ice during chopping.

No. 2. Three percent milk powder; 39 percent added water.

No. 3. One percent Gelsoy, 39 percent added water.

No. 4. One percent Gelsoy, 42 percent added water.

No. 5. One percent Gelsoy, 49 percent added water.

Normally the use of such large quantities of water would result in sausage which contains fat and water pockets resulting from separation and breakdown of the emulsion during the stuffing and cooking operations. The formula selected is one which is very sensitive to such breakdown because of the ratio of fat and water to lean meat tissue.

The results of the above experiments are as follows:

| Test | Fat Separation | Texture |
|---|---|---|
| 1 | Considerable | Fair. |
| 2 | Considerable | Fair. |
| 3 | Considerable, slightly more than 1 and 2 | Good. |
| 4 | Equal to about 25 percent of the separation in 1 and 2. | Good. |
| 5 | None | Good. |

I claim:

1. In a method of manufacturing emulsion-type sausages having as essential ingredients meat, seasoning and curing agents, and water comprising macerating the meat ingredients in the presence of water the improvement comprising incorporating with said ingredients during the maceration thereof as binder for water and as emulsion stabilizer 0.25 percent to 5.0 percent, based on the meat-fat formula, of a water extractable proteinaceous material from oil-free soybean material that has been previously extracted with a lower aliphatic alcohol.

2. In a method of manufacturing emulsion-type sausages comprising chopping an ingredient formula comprising a major proportion of lean meat, a minor proportion of fat and water, the improvement which comprises incorporating in said formula 0.25 percent to 5.0 percent based on the meat-fat formula of a water extractable proteinaceous material from oil-free soybean material that has been previously extracted with a lower aliphatic alcohol.

3. The method comprising a comminuting a major proportion of lean meat and a minor proportion of fat in the presence of added water at least partially in the form of ice, and 0.25 to 5.0 percent, based on the meat-fat formula, of an emulsion stabilizer comprising a water extractable proteinaceous material from oil-free soybean material that has been previously extracted with a lower aliphatic alcohol to form a meat emulsion, forming the meat emulsion into sausages, smoking, and then cooking the sausages.

4. The method of claim 3 in which the amount of added water is over 40 percent based on the formula weight.

References Cited in the file of this patent

UNITED STATES PATENTS

| | | |
|---|---|---|
| 2,035,136 | Levinson et al. | Mar. 24, 1936 |
| 2,060,160 | Allen | Nov. 10, 1936 |
| 2,355,548 | Musher | Aug. 8, 1944 |
| 2,495,706 | De Voss et al. | Jan. 31, 1950 |
| 2,634,212 | Komarik | Apr. 7, 1953 |